Aug. 14, 1962 J. W. WARING 3,049,682

CONSTANT BANDWIDTH COUPLING SYSTEM

Original Filed March 7, 1955 3 Sheets-Sheet 1

INVENTOR.
JOHN W. WARING
BY
Robert D. Sanborn
ATTORNEY

CONSTANT BANDWIDTH COUPLING SYSTEM

Original Filed March 7, 1955 3 Sheets-Sheet 2

INVENTOR.
JOHN W. WARING
BY
Robert D. Sanborn
ATTORNEY

Aug. 14, 1962 J. W. WARING 3,049,682

CONSTANT BANDWIDTH COUPLING SYSTEM

Original Filed March 7, 1955 3 Sheets-Sheet 3

INVENTOR.
JOHN W. WARING
BY
Robert D. Sanborn
ATTORNEY

3,049,682
CONSTANT BANDWIDTH COUPLING SYSTEM

John W. Waring, Palmyra, N.J., assignor, by mesne assignments, to Philco Corporation, Philadelphia, Pa., a corporation of Delaware
Original application Mar. 7, 1955, Ser. No. 492,603, now Patent No. 2,912,656, dated Nov. 10, 1959. Divided and this application Oct. 26, 1959, Ser. No. 848,635
6 Claims. (Cl. 333—70)

This application is a division of my copending application Serial No. 492,603, filed March 7, 1955, now Patent No. 2,912,656. The invention relates to interstage coupling circuits, and more particularly to constant bandwidth interstage coupling circuits for tunable stages.

Recent developments in the field of communications have pointed to the need for tunable selective amplifier circuits which will operate satisfactorily over a very wide tunable range. Particularly in the field of UHF television reception the need has arisen for multistage active preselector circuits having a passband of preselected width of say 10 megacycles which is positionable at will anywhere within the band between 470 and 890 megacycles. Selective circuits of this type generally employ a parallel tuned circuit or its equivalent in the output circuit of one stage, and a second parallel tuned circuit or its equivalent at the input of the following stage. These parallel tuned circuits are tuned in synchronism over the desired band, usually through the use of suitably ganged capacitors. Means must also be provided for coupling the output tuned circuit of one stage to the input tuned circuit of the following stage. Preferably the coupling means should be so constructed that no adjustments are required in the coupling circuit per se as the individual stages are tuned over the band. Other requirements are that the amplitude response of the entire interstage network, including the parallel tuned circuits, should be substantially constant over the major portion of the 10 megacycle passband, and that the amount of coupling from one stage to the next be a maximum consistent with the constant bandwidth and flat frequency response characteristic. Needless to say the coupling circuit should be as simple and inexpensive as possible.

It can be shown that two requirements must be met if the above conditions are to be satisfied. The first requirement is that the entire interstage network, including the two end circuits, must be such that the pole-zero diagram of the transfer impedance characteristic includes a pole at each of the −1 db points of the response characteristic, and such that the spacing between these poles remains constant as the end circuits are tuned over the desired frequency range. The second requirement is that the loading of the end circuits must vary as a function of frequency so that the entire interstage network remains critically loaded as the end circuits are tuned over the desired frequency range. These requirements are met in circuits embodying the present invention.

Various coupling circuits have been employed in the past with no real success. The simplest coupling means consists of two end circuits placed close together to provide mutual coupling between the inductive portions thereof. Such circuits are indeed simple but they may cause a more than two-to-one change in bandwidth for a two-to-one change in tuning frequency. In addition, straight mutual coupling of this type may cause undesirable changes in the shape of the passband. One variation of the straight mutual coupling between the two tuned circuits comprises placing an untuned inductive loop between the two tuned circuits so that there is mutual coupling between each tuned circuit and the loop, but no mutual coupling between the tuned circuits themselves.

In some instances a similar coupling characteristic may be obtained by replacing the inductive loop with an inductor physically connected from a selected point on one tuned circuit to an appropriate point on the other tuned circuit. In general these circuits have coupling characteristics similar to the first mentioned coupling circuit and, for this reason, have the same disadvantages. Attempts have been made in the past to improve the operation of the straight inductive coupling circuits by adding a capacitor in series between the two tuned circuits. In theory the addition of such a capacitor will provide a marked improvement in the coupling characteristic, and this improvement is realized to a certain extent at the lower frequencies. However at higher frequencies, for example in the UHF band assigned to television systems, the equivalents of the parallel tuned circuits are made up of stray capacitance, lead inductance and other distributed factors. Furthermore, it is often necessary to provide range extension circuits, of the type hereinafter described, to achieve tuning over the desired two-to-one range. It has been found experimentally that, while the additional capacitive coupling between the two tuned circuits may be an improvement over straight inductive coupling, the bandwidth may still change by a factor of approximately two-to-one over a two-to-one change in frequency. In general the failure to maintain a constant bandwidth has resulted from a failure to maintain the proper pole spacing in the transfer impedance characteristic.

In addition to the difficulty encountered in maintaining a constant bandwidth over a two-to-one frequency range, generally it is very difficult to tune the parallel-tuned end circuit associated with vacuum tubes over a two-to-one frequency range in the UHF band. This difficulty arises from the fact that it is necessary to provide leads from the elements within vacuum tubes to external circuit elements. Tubes designed for operation at UHF frequencies have the elements arranged to reduce the lengths of these leads, but there is a lower limit of lead length below which it is not practical to go. These leads represent a certain amount of inductance which cannot be eliminated from the circuit. Leads and connections outside the tube add additional inductance and some stray capacitance. Usually this lead inductance forms the entire inductive component of the tuned end circuits. Generally the equivalent of a parallel tuned circuit is achieved at ultrahigh frequencies by providing a variable tuning capacitor in series with the lead inductance mentioned above. The tuning capacitor is adjusted so that the net inductive reactance of the lead inductance and the tuning capacitor is equal to the net capacitive reactance due to stray tube and wiring capacitance at the frequency to which the circuit is to be tuned. Obviously a large capacitance is required at the low frequency end of the tuning range, but a very small capacitance is required at the upper end of the tuning range. Generally it is impossible to obtain a variable capacitor, suitable for use in a television tuner or the like, which has the desirable range of capacitance variation. The range extension circuit mentioned above is a novel arrangement for reducing the apparent minimum capacitance of the tuning capacitor without reducing to any great extent the maximum value of capacitance obtainable with the tuning capacitor.

Therefore it is an object of the present invention to provide a novel interstage coupling circuit which will give substantially constant bandwidth coupling between two tuned circuits over a wide frequency range.

A further object of the invention is to provide a novel constant bandwidth coupling circuit which is usable in the ultrahigh frequency range.

Another object of the invention is to provide a novel coupling network having a readily controllable pole spacing in its transfer impedance characteristic over at least a two-to-one frequency range.

Still another object of the invention is to provide a simple novel means for extending the tuning range of ultra-high frequency circuits.

In general these and other objects of the invention are accomplished by providing a coupling network, between the tuned end circuits, which provides two signal paths, or their equivalent, between selected points on the two end circuits. One path includes only capacitance, and the second path includes both inductance and capacitance but appears as an inductive reactance over the tunable range. The second path is arranged to be series resonant at a frequency below the tunable range, and the two signal paths form the equivalent of a parallel circuit which is resonant at a frequency above the tunable range. The variation in the loading of the end circuits with frequency is accomplished through the proper selection of the inductive and capacitive reactances in the tuned end circuits.

For a better understanding of the invention reference should now be made to the following detailed description which is to be read in conjunction with the accompanying drawings in which.

Figure 1:
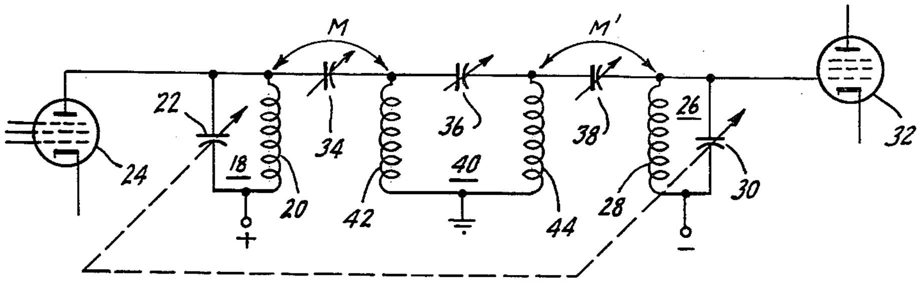
FIG. 1 is a schematic drawing of the coupling circuit disclosed and claimed in my abovementioned copending application.

Turning now to the circuit of FIG. 1, a parallel resonant circuit 18, comprising inductor 20 and capacitor 22, forms the anode load for vacuum tube 24 and also one end circuit of the interstage coupling network. One common terminal of this parallel resonant circuit 18 is connected to a suitable source of anode supply potential represented by the plus sign (+) in FIG. 1. The other common terminal is connected to the anode of tube 24. A second parallel tuned circuit 26, comprising inductor 28 and capacitor 30, forms the input circuit of a second amplifier stage including vacuum tube 32 and the other end circuit of the interstage network. One common terminal of parallel circuit 26 is returned to a source of bias potential represented by the minus sign (—) in FIG. 1, while the other common terminal is connected to the control grid of tube 32. Capacitors 22 and 30 are ganged so that parallel circuits 18 and 26 are tuned in synchronism over a selected range of frequencies. The capacitive path between parallel tuned circuits 18 and 26 is provided by capacitors 34, 36 and 38. The second path comprises a tuned link 40 which is inductively coupled to inductors 20 and 28 respectively. More specifically inductor 42 of link 40 is inductively coupled to inductor 20, and inductor 44 of link 40 is inductively coupled to inductor 28. Inductors 42 and 44 and capacitor 36 form a circuit which is made resonant at a frequency below the tunable band.

While the circuit shown in FIG. 1 does not provide two separate physical paths between end circuits 18 and 26, it can be shown mathematically that the circuit of FIG. 1 provides the equivalent of two such paths. For the moment, however, attention will be concentrated on the practical aspects of adjusting the circuit of FIG. 1. As stated above, end circuits 18 and 26 are made tunable over a preselected frequency range. The mutual inductances M, between inductors 20 and 42, and M′, between inductors 44 and 28, are adjusted to provide the desired coupling at approximately the mid-point of the tuning range. Usually this is accomplished by adjusting the physical position of one inductor with respect to the one to which it is mutually coupled. However, in some instances it may be more convenient to provide a core of a magnetic material which is so positioned as to effect the coupling between the mutually coupled inductors. Once the desired coupling is established at the mid-point of the tunable range, the end circuits 18 and 26 may be tuned to the lower end of the tunable range and capacitor 36 may be adjusted to set the bandwidth to the desired value for this setting of the tuned end circuits. Circuits 18 and 26 may then be tuned to the upper end of the tunable range, and capacitors 34 and 38 may be adjusted to set again the bandwidth of the coupling circuit at the value selected for the mid-frequency point. It has been found in practice that the adjustments at the two ends of the tunable range have very little effect on each other, and only a slight effect on the mid-frequency adjustment achieved by controlling the mutual coupling M and M′. Capacitors 34, 36 and 38 are shown as adjustable elements in the diagram of FIG. 1. However, it should be understood that the values of these elements are not changed once the coupling circuit is properly adjusted, and only the values of capacitors 22 and 30 are changed to tune the coupling circuit over the desired band. For this reason circuits of the type shown in FIG. 1 may be constructed having fixed capacitors in place of adjustable capacitors 34, 36 and 38. In some instances it may be desirable to provide a limited range of adjustment in order to provide a convenient means for compensating for unavoidable variations in circuit constants normally encountered in the mass production of components.

Figure 2:
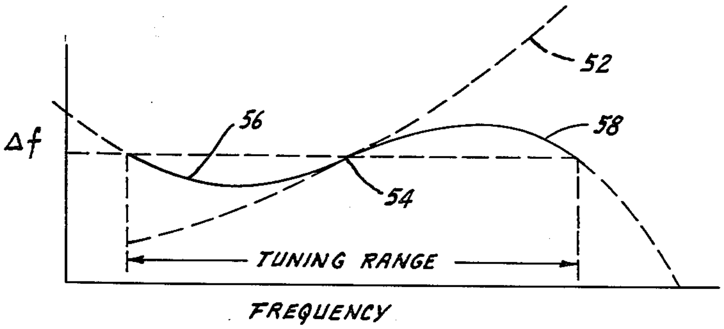
FIG. 2 is a plot of the bandwidth of the circuit of FIG. 1 as a function of frequency.

The graph of FIG. 2 illustrates in a general way the adjustments in the bandwidth which are possible with the circuits of FIG. 1. The graph of FIG. 2 assumes that the end circuits are critically loaded at all frequencies within the tunable range. It is relatively easy to achieve critical loading since the critical loading for a constant bandwidth circuit is a linear function of the frequency. In FIG. 2 curve 52 represents the variation in bandwidth with frequency which could be expected with only inductive coupling between inductors 20 and 28. This curve may be moved in the vertical direction by adjusting the mutual couplings M and M′. These mutual couplings are adjusted to place point 54 on curve 52 at the desired bandwidth for mid-frequency. Placing link 40 in the circuit causes the lower frequency end of the curve 52 to be raised as shown at 56, so that the bandwidth at the lower frequency end of the tuning range is again equal to that at point 54. In fact, curve 56 continues to rise below the tunable range as the resonant frequency of link 40 is approached. If the tunable range extends from say 500 to 1,000 megacycles, the resonant frequency below the tunable band should be at approximately 300 megacycles. Capacitors 34 and 38 cause the upper end of the curve 52 to be depressed as shown at 58. As shown in FIG. 2, the bandwidth does not remain exactly constant over the entire tuning range, but the deviation from the desired value may be made small by proper selection of the circuit constants. The maximum deviation shown in FIG. 1 may be further reduced by causing curves 56 and 58 to cross the horizontal broken line representing the desired bandwidth at points slightly inside the limits of the tunable range. Preferably the resonance above the tunable band should occur at approximately 1,600 megacycles.

It is possible, although usually less desirable, to cause the bandwidth to increase as a function of the frequency to which the end circuits are tuned. Obviously the circuit of FIG. 1 can be adjusted to cause this increase to be a function different from that resulting from straight inductance coupling. The two ends of the curve representing this variation may be shaped separately in the manner mentioned above.

Figure 3:
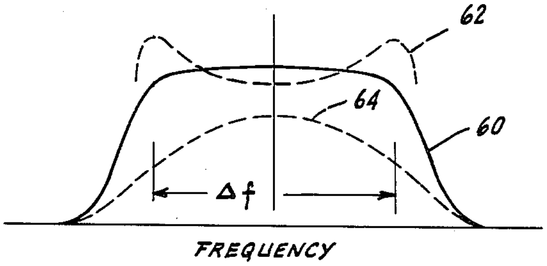
FIG. 3 is a plot showing the shape of the passband of the circuit of FIG. 1 for various conditions of loading.

If the end circuits are critically loaded, the passband will have the ideal flat-topped shape shown at 60 in FIG. 3. If the loading is less than critical, the passband curve will take on the doubled hump shape shown at 62 and, if the loading is greater than critical, the passband curve will have a lower amplitude and a curved top as shown at 64. It is well known that the passband $\Delta f$ can be obtained with other values of coupling and loading and with a passband curve similar to curve 60 except that the maximum amplitude of the curve will be lower. A lower amplitude of curve 60 means less over-all gain for the coupled stages. Therefore, in designing a circuit in accordance with the present invention, the values of critical coupling and loading to give the maximum flat-topped response for the selected bandwidth are computed, and the mutual inductances M and M' of FIG. 1 are adjusted to provide this critical coupling. As explained above, the coupling network of the present invention will maintain the coupling necessary to provide this ideal response curve over the entire tunable range.

The control grid of tube 24 of the circuit of FIG. 1 may be connected to a coil or other form of input circuit which is supplied with a signal from another amplifier stage or from an antenna. Similarly the signal at the anode of tube 32 may be supplied to another amplifier stage or to a heterodyne converter. The bandpass characteristic of the interstage coupling network of FIG. 1 will block interfering signals from stations in adjacent channels or from other sources that would normally pass through a wideband amplifier stage.

Figure 4:
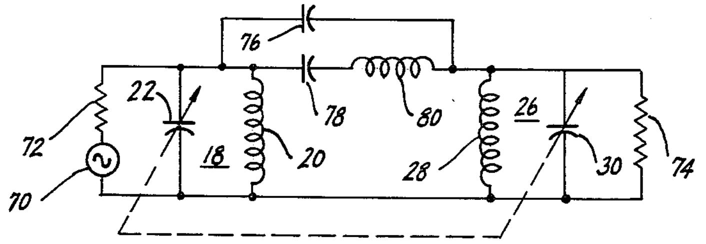
FIG. 4 is a schematic diagram of a first preferred embodiment of the invention claimed in this application.

FIG. 4 illustrates a perferred form of the invention claimed in this application. In the circuit of FIG. 4, the two paths mentioned above are clearly shown. End circuits 18 and 26 correspond to similarly numbered elements in FIG. 1. Tube 24 or its equivalent is schematically represented in FIG. 4 by a signal source 70 in series with a source impedance 72. Similarly tube 32 is schematically represented by a load impedance 74 in shunt with end circuit 26. In FIG. 4 the capacitive path is provided by capacitor 76. The second path is provided by capacitor 78 and inductor 80. There is substantially no mutual inductance between coils 20 and 28. The values of capacitor 78 and inductor 80 are chosen so that the impedance of the second path remains inductive over the tunable range. It can be seen that, if this second path approaches series resonance at the lower end of the tunable range, the coupling through the second path will be greater than that provided by a single inductor. Similarly, if the parallel combination of the first path and the second path approach resonance at the upper end of the tunable range, the coupling impedance will be greater than the impedance of a single inductor and the amount of coupling will be correspondingly less. Therefore the response characteristic of the circuit of FIG. 4 will be similar to curve 56—58 of FIG. 2.

Figure 5:
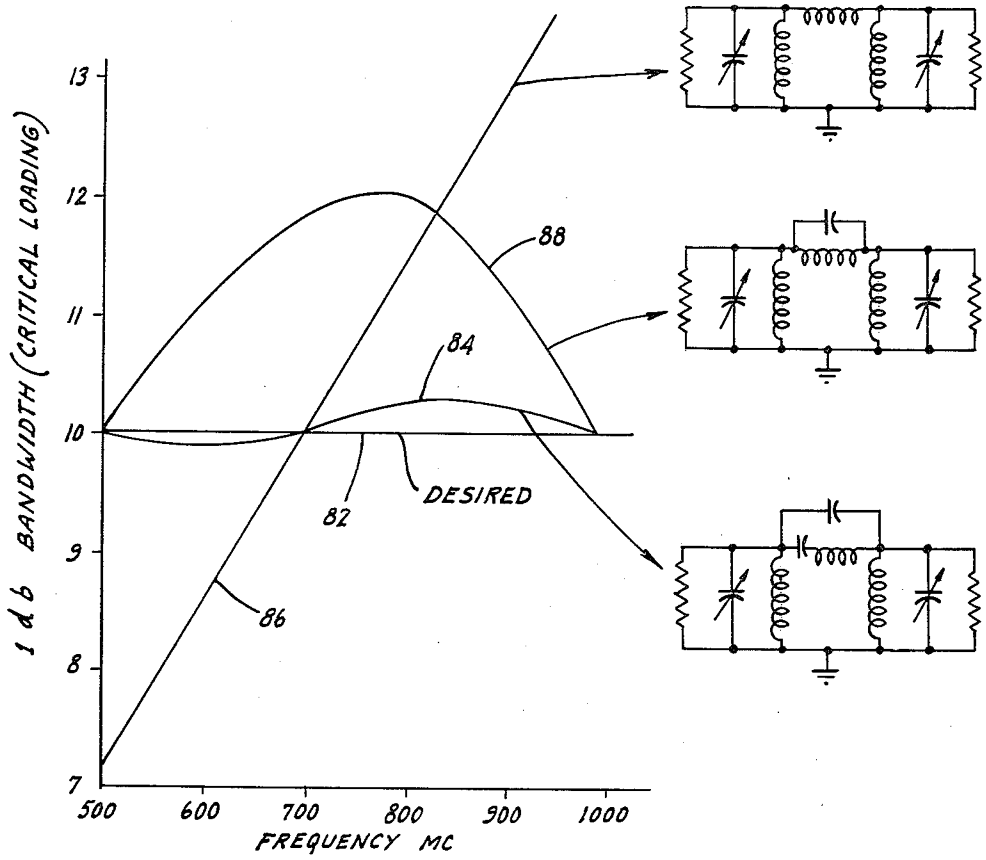
FIG. 5 is a plot of bandwidth against frequency for three different types of circuits, one of which is the embodiment of FIG. 4.

FIG. 5 is a series of curves which show the improvement afforded by the present invention over known types of circuits. The coordinates of FIG. 5 are the same as those of FIG. 2. The horizontal line 82 in FIG. 5 shows the ideal or desired constant bandwidth. Curve 84 shows the nearly ideal characteristic obtained with the circuit of FIG. 4. The line 86 illustrates the variation in bandwidth normally encountered with only inductive coupling between the two end circuits, and curve 88 shows the effect of supplementing the inductive coupling with capacitive coupling.

FIGS. 6 through 9 show other embodiments of the present invention. It will be noted that each of these embodiments includes a capacitive path 90, and a second path 92, between end circuits 18 and 26. The second path 92 includes both inductance and capacitance, but has a net inductive reactance over the tunable range of the end circuits. All of these circuits exhibit a characteristic curve similar to curve 84 of FIG. 5.

Figure 6:
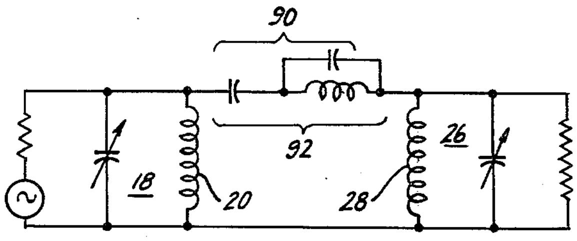
FIGS. 6, 7, 8 and 9 are schematic diagrams of still other embodiments of the present invention.

The embodiment of FIG. 6 is similar to the one shown in FIG. 4 except that a portion of the capacitive path 90 is in common to the second path 92.

Figure 7:
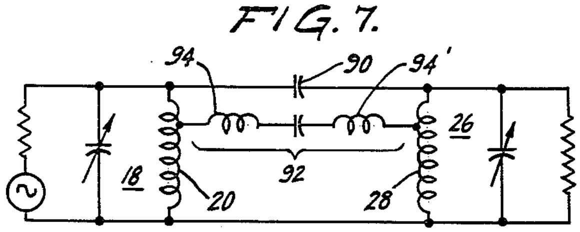

In FIG. 7 the inductor 80 of FIG. 4 has been split in two parts 94 and 94', and path 92 is connected between intermediate taps on inductors 20 and 28.

Figure 8:
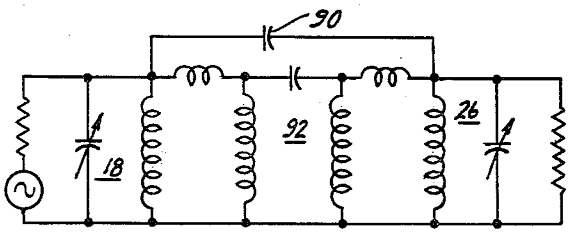

In FIG. 8 the T networks, formed by inductors 20 and 94 and by inductors 28 and 94' in FIG. 7, have been replaced by equivalent $\pi$ networks. No mutual coupling is employed in the embodiments shown in FIGS. 6, 7 and 8.

Figure 9:
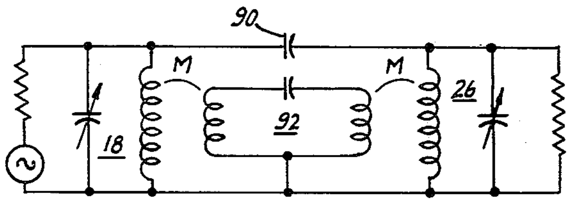

The embodiment of FIG. 9 is similar to the embodiment of FIG. 1 except that a separate capacitive path 90 is provided.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A coupling circuit comprising first and second similar synchronously tunable end circuits, means directly coupling a point on said first end circuit to a point on said second end circuit, and a coupling network connecting said two end circuits, said coupling network providing two signal paths, a first one of said signal paths being solely capacitive and the second one of said signal paths exhibiting the characteristic of a series combination of inductors and capacitors, said second path exhibiting a series resonance effect at a frequency lower than the lowest frequency to which said end circuits are to be tuned, and said two paths in combination exhibiting a parallel resonance effect at a frequency higher than the highest frequency to which said two end circuits are to be tuned, the net inductive reactance of said two paths, at a frequency approximately midway between the two extremities to which said end circuits are to be tuned, being approximately equal to that of a single inductor connecting said two end circuits which would give critical coupling, said first path extending directly from a point on said first end circuit at a signal potential other than reference potential to a corresponding point on said second end circuit, said second path extending directly from a selected region of one end circuit to a corresponding region of the other end circuit, all components of both of said paths being electrically isolated from said directly coupled points on said first and second end circuits.

2. A coupling circuit comprising first and second similar synchronously tunable end circuits, means directly coupling a point on said first end circuit to a point on said second end circuit, and a coupling network connecting said two end circuits, said coupling network providing two signal paths, a first one of said paths being solely capacitive and the second one of said paths exhibiting the characteristic of a series combination of inductors and capacitors, said first path being electrically separate from said second path said second path exhibiting a series resonance effect at a frequency lower than the lowest frequency to which said end circuits are to be tuned, and said two paths in combination exhibiting a parallel resonance effect at a frequency higher than the highest frequency to which said end circuits are to be tuned, the net inductive reactance of said two paths, at a frequency midway betwen the two extremities to which said end circuits are to be tuned, being approximately equal to that of a single inductor connecting said two end circuits which would give critical coupling, said first path extending directly from a point on said first end circuit at a signal potential other than reference potential to a corresponding point on said second end circuit, said other path extending directly from a selected region of one end circuit to a corresponding region of the other end circuit, all components of both of said signal paths being electrically isolated from said directly coupled points on said first and second end circuits.

3. A coupling circuit comprising first and second similar synchronously tunable end circuits, each of said end circuits comprising an inductive reactance means and a capacitive reactance means in parallel, a first terminal of said inductive reactance means and a first terminal of said capacitive reactance means in said first end circuit being connected directly to a first terminal of said inductive reactance means and a first terminal of said capacitive reactance means in said second end circuit, and a coupling network connecting said two end circuits, said coupling network providing two signal paths, a first one of said signal paths being solely capacitive and the second one of said signal paths exhibiting the characteristic of a series combination of inductors and capacitors, said first path being connected from a second terminal of said inductive reactance means and a second terminal of said capacitive reactance means of said first end circuit which are remote from said respective first terminals thereof to a second terminal of said inductive reactance means and a second terminal of said capacitive means of said second end circuit which are remote from said respective first terminals thereof, said first path being electrically isloated from said directly coupled first terminals, said second path exhibiting a series resonance effect at a frequency lower than the lowest frequency to which said end circuits are to be tuned, and said two paths in combination exhibiting a parallel resonance effect at a frequency higher than the highest frequency to which said end circuits are to be tuned, the net inductive reactance of said two paths, at a frequency approximately midway between the two extremities to which said end circuits are to be tuned, being approximately equal to that of a single inductor connecting said two end circuits which would give critical coupling, said second path extending directly from a selected region of one end circuit to a corresponding region of the other end circuit, said second path being electrically separate from said first path and all components of said second path being electrically isolated from said directly coupled first terminals.

4. A coupling circuit comprising first and second synchronously tunable end circuits and a coupling network connecting said two end circuits, said coupling network comprising an inductor and a first capacitor connected in series between said two end circuits, said series circuit being resonant at a frequency below the tunable range of said end circuits, and a second capacitor connected in shunt with said inductor, said inductor and said capacitor being resonant at a frequency above the tunable range of said end circuits, said first tunable end circuit having a point thereon directly coupled to a corresponding point on said second tunable end circuit, said coupling network being electrically isolated from said directly coupled points on said two end circuits.

5. A coupling circuit comprising first and second similar synchronously tunable end circuits, means directly coupling a first point on said first end circuit to a corresponding first point on said second end circuit, a first capacitor connecting a point other than said first point on one of said end circuits to a corresponding point on the other of said end circuits, and a series circuit comprising a second capacitor and an inductor connected between a point other than said first point on said first end circuit and a corresponding point on said second end circuit, said capacitor and said series circuit being electrically isolated from said directly coupled first points, said series circuit exhibiting a series resonance effect at a frequency lower than the lowest frequency to which said end circuits are to be tuned, said series circuit together with said first capacitor exhibiting a parallel resonance effect at a frequency higher than the highest frequency to which said end circuits are to be tuned, the net effective inductive reactance of said series circuit and said first capacitor, in combination, at a frequency approximately midway between the two extremities to which said end circuits are to be tuned, being approximately equal to that of a single inductor connecting said two end circuits which would give critical coupling.

6. A coupling circuit comprising first and second similar synchronously tunable end circuits, a first capacitor connecting a first point on one of said end circuits to a corresponding first point on the other of said end circuits, and a series circuit comprising a second capacitor and at least one inductor connected between a second point on said first end circuit and a corresponding second point on said second end circuit, said series circuit exhibiting a series resonance effect at a frequency lower than the lowest frequency to which said end circuits are to be tuned, said series circuit together with said first capacitor exhibiting a parallel resonance effect at a frequency higher than the highest frequency to which said end circuits are to be tuned, the net effective inductive reactance of said series circuit and said first capacitor, in combination, at a frequency approximately midway between the two extremities to which said end circuits are to be tuned, being approximately equal to that of a single inductor connecting said two end circuits which would give critical coupling, a third point on said first synchronously tunable end circuit being directly coupled to a corresponding third point on said second synchronously tunable end circuit, said first capacitor and said series circuit being electrically isolated from said directly coupled points on said first and second end circuits.

References Cited in the file of this patent

UNITED STATES PATENTS

| | | |
|---|---|---|
| 2,276,873 | Rambo et al. | Mar. 17, 1942 |
| 2,912,656 | Waring | Nov. 11, 1959 |